(12) United States Patent
Tatley et al.

(10) Patent No.: US 8,413,387 B2
(45) Date of Patent: Apr. 9, 2013

(54) COMPOSITION, METHOD OF USE, AND STRUCTURAL BARRIER SYSTEM

(75) Inventors: Ronald D. Tatley, Edmonds, WA (US); Thomas J. Schneider, Oregon City, OR (US)

(73) Assignee: Building Envelope Innovations, LLC, Seattle, WA (US)

( * ) Notice: Subject to any disclaimer, the term of this patent is extended or adjusted under 35 U.S.C. 154(b) by 159 days.

(21) Appl. No.: 12/770,606

(22) Filed: Apr. 29, 2010

(65) Prior Publication Data

US 2011/0072747 A1 Mar. 31, 2011

Related U.S. Application Data

(63) Continuation of application No. 11/952,022, filed on Dec. 6, 2007, now abandoned.

(51) Int. Cl.
*E04D 1/36* (2006.01)
*E04D 11/00* (2006.01)
*E04C 1/00* (2006.01)
*E04B 1/62* (2006.01)
*C04B 14/00* (2006.01)

(52) U.S. Cl. ............. 52/58; 106/400; 52/309.1; 52/515

(58) Field of Classification Search .............. 106/400; 52/58, 309.1, 515

See application file for complete search history.

(56) References Cited

U.S. PATENT DOCUMENTS

| | | | |
|---|---|---|---|
| 4,618,656 A | 10/1986 | Kawakubo et al. | |
| 5,899,026 A | 5/1999 | Williams et al. | |
| 6,401,401 B1 | 6/2002 | Williams | |
| 6,401,402 B1 | 6/2002 | Williams | |
| 6,613,816 B2 | 9/2003 | Mahdi et al. | |
| 6,828,403 B2 * | 12/2004 | Mahdi et al. | 528/18 |
| 7,087,127 B2 | 8/2006 | Mahdi et al. | |
| 2004/0258859 A1 | 12/2004 | Acevedo et al. | |
| 2006/0010788 A1 | 1/2006 | Nettleton | |
| 2006/0093828 A1 | 5/2006 | Mahdi et al. | |
| 2006/0236618 A1 | 10/2006 | Williams | |

* cited by examiner

*Primary Examiner* — Shuangyi Abu Ali
(74) *Attorney, Agent, or Firm* — Seed IP Law Group PLLC

(57) ABSTRACT

An environmental barrier composition and method of use for forming a structural barrier system to seal structural openings such as doors and windows is provided. The composition includes a liquid rosin that is silyl-terminated polyether, a filler material, and a curing catalyst. The method includes applying the composition to a prepared through-hole in combination with flashing material at least along a bottom surface of the through-hole and installation of a window or door into the prepared through-hole to form a barrier system in which a continuous film can be easily inspected, is waterproof, meet air barrier requirements of ASTM E2178, has elastomeric properties, allows substrate expansion, contraction, and movement, does not shrink or lose volume as it cures, and cures rapidly with sufficient adhesion to transition flashing to incorporate into a designed drainage plane and allow integration of a continuous air barrier system where the barrier is at least semi-vapor-permeable.

14 Claims, 9 Drawing Sheets

COMPOSITION, METHOD OF USE, AND STRUCTURAL BARRIER SYSTEM

BACKGROUND OF THE INVENTION

1. Field of the Invention

The present invention pertains to a substance for creating an environmental barrier and, more particularly, to a formulation and method of use for a liquid applied membrane to construct a structural barrier system that seals structural openings such as doors and windows.

2. Description of the Related Art

Tremendous damage to buildings, both large and small, is caused by water leaking into rough openings and framing due to faulty window and door installations or leaky windows. Owners, builders, and insurance companies can face tremendous costs in the restoration and repair of this damage. Window and door installation failure can cause delays in construction, increased insurance premiums for builders and building owners, warranty liability for builders, and increased cost of home ownership for the general population.

Even when builders carefully follow detailed installation instructions and recognized trade organization procedures, these window and door installation methods can leave the openings susceptible to water intrusion. Frequently, installation procedures are difficult to follow with multiple steps and layers of products have been used in an attempt to keep the water out. Complex installation procedures are often difficult to follow, and increasing the complexity of the installation procedure has not reduced the incidence of water intrusion and damage.

In recent years there has been an increasing use of liquid applied flashing membranes in the construction industry, especially in the course of installing windows and doors. Window and door penetrations of the building envelope are prone to water and air intrusion, resulting in health risks, structural damage, and financial loss. In the past, metal flashings have been used for this purpose but have low performance rates due to metallic corrosion, fastener penetration, thermal transfer and difficulty of fabrication on site. Self-adhered, flexible flashing membranes, typically consisting of a polyethylene membrane weather side with an SBS rubberized asphalt compound as the adhesive side, have offered an alternative. These products were established in the industry as a quality concept, but the construction site environment, wet conditions, staining of other construction materials, and non-vapor-permeable characteristics have resulted in construction failures. Drawbacks to these materials include difficult application techniques, adhesive failure on moist substrates, lack of resistance to weather exposure, and narrow service temperature along with the inability to effectively integrate the through wall component with an existing water and air barrier system.

One recent attempt to overcome the problem of attempting to apply a waterproof membrane to a complex penetration in the building envelope has been the development of liquid applied membranes. This concept consists of applying by brush, roll, trowel, or spray a material to the exterior construction wall penetration openings and at the exterior side of the wall sheathing or other substrates a product that becomes by way of cross-linking, solvent evaporation, coalescence or other such means of cure, a continuous membrane capable of resisting air and water penetration. A common problem with many of these materials is the inherent need for solvents, be they water, petroleum distillates, or other volatile materials required to reach a viscosity needed for the application technique. The volatile material is expressed into the surrounding atmosphere resulting in odor, health and fire danger, pollution, and other complications, most notably, loss of volume in the membrane. This loss in volume as the material cures creates tension at the crucial membrane-substrate interface, increasing the potential for adhesive and cohesive failure. These systems do not typically allow a continuous air and water barrier to be achieved across the interface of the component and the wall opening.

The use of liquid applied flashing membranes in the construction of residential and commercial structures is known. Common drawbacks are shrinkage of membrane, weather resistance during construction schedule, limited water-ponding resistance, and long-term flexibility, as well as limited ability to integrate the through-wall component with the prepared opening.

There is therefore a need for a liquid applied flashing membrane that can be applied under adverse conditions to irregular, moist substrates, forming a film membrane that renders the building envelope penetration or opening water and air proof, meets air barrier association requirements for air transmission through membranes, is elastic and weather durable, and does not emit dangerous or flammable materials. Such film will not shrink or pull away from the substrate under violent weather conditions, and it must be capable of inspection after completion, The material must meet Volatile Organic Compound (VOC) requirements in all of North America, must cure rapidly enough to maintain construction schedule deadlines, must be weather resistant to allow for extended exposure to exterior elements, and must allow water vapor transmission so the substrate can dry if it contains water when material is applied. The material must also be able to incorporate other products needed to transition water from a leaky building component, such as a window or door, to the exterior drainage plane of the structure.

BRIEF SUMMARY OF THE INVENTION

The disclosed embodiments of the various inventive features related to the composition, method of use, and resulting structural barrier system set forth herein overcome the foregoing challenges and meet the above-listed requirements. A formulation is provided for an elastomeric composition for coating of the building envelope penetration or opening to provide a water and air barrier that can be integrated with the through-wall component, whether it is a window or a door.

In accordance with another embodiment, the applied composition provides a novel composite article that includes a construction wall opening coated with the aforementioned elastomeric composition.

In accordance with a further embodiment, the applied composition has distinct properties of weather durability, vapor permeability, flexibility with no material shrinkage due to solvent loss during cure and no unusual bonding characteristics when applied to a wide variety of construction substrates under adverse conditions.

The composition exhibits a shelf life up to a year, is chemically stable up to 400° F. and results in a coating that passes or exceeds current flashing standard requirements and that bonds sufficiently to itself and other construction substrates to provide integration of a through-wall component in a prepared opening. The composition is non-flammable, releases no isocyanates, does not support mold growth, and can be subjected to precipitation directly after application.

In accordance with yet a further embodiment of the invention, a coating composition is provided that includes a liquid rosin that is a silyl-terminated polyether, a filler material, and a curing catalyst. Ideally, the coating composition includes the silyl-terminated polyether that is polypropylene oxide capped at respective termini by a silyl group represented by: —SiR$^1_t$(OR$^2$)$_{3-t}$, wherein, t is 0, 1 or 2, R$^1$ and R$^2$ are the same or different and independently an alkyl group.

In accordance with a further embodiment, a method of forming a structural barrier system is provided, the method including applying a liquid flashing membrane material to a prepared surface, the material comprising a liquid rosin, a filler material, and a curing catalyst, wherein the liquid rosin is a silyl-terminated polyether, and applying a sheet of flashing to a selected area in the through-hole and at least partially on the liquid-applied flashing material.

In accordance with still yet a further embodiment of the invention, a structural barrier system is provided that includes a liquid-applied flashing membrane applied to a through-hole formed in a structural member, the liquid-applied flashing material comprising a liquid rosin, a filler material, and a curing catalyst, wherein the liquid rosin is a silyl-terminated polyether, a sheet of flashing applied partially over the material and to a bottom surface of the through-hole and to extend horizontally on each side of the through-hole on exterior sheathing, and a window or door unit applied to the through-hole over the flashing and the cured liquid-applied flashing material.

BRIEF DESCRIPTION OF THE DRAWINGS

The foregoing and other features and advantages of the present invention will be more readily appreciated as the same becomes better understood from the detailed description of the invention when considered in conjunction with the following drawings, wherein.

DETAILED DESCRIPTION OF THE INVENTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or components or both associated with window and door installations and other building installations, including but not limited to double hung windows, exterior siding, and electrical and plumbing details have not been shown or described in order to avoid unnecessarily obscuring descriptions of the embodiments.

Unless the context requires otherwise, throughout the specification and claims that follow, the word "comprise" and variations thereof, such as "comprises" and "comprising" are to be construed in an open inclusive sense, that is, as "including, but not limited to." The foregoing applies equally to the words "including" and "having."

Reference throughout this description to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Reference throughout this description to "liquid" is not intended in a limiting sense, but is rather intended to refer to an uncured state for the particular material being described, and does not necessarily mean the material has certain viscosity characteristics or is water based.

Figure 1:
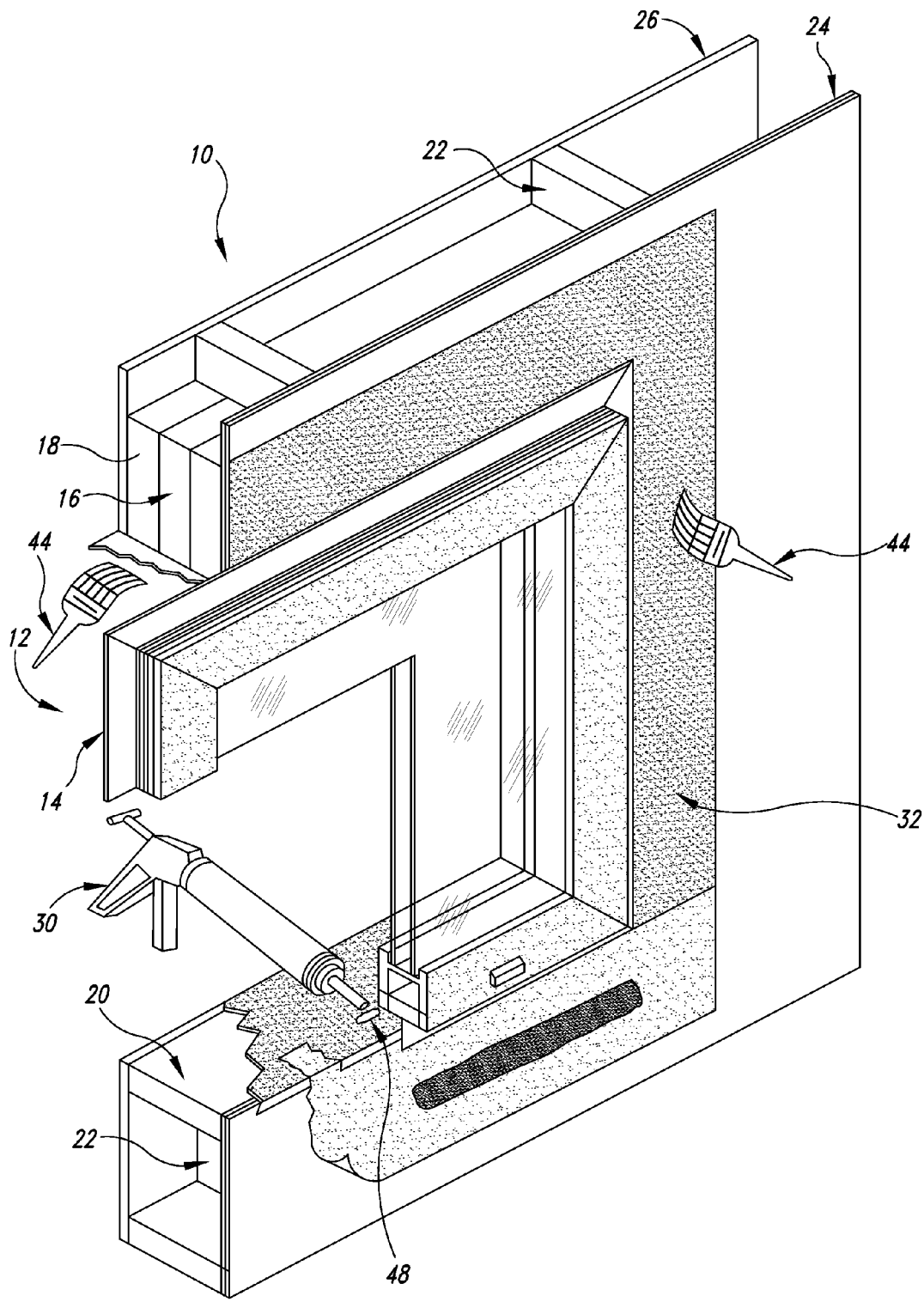
FIG. 1 is an isometric view of a structural barrier system for windows formed in accordance with one embodiment of the invention.

Turning to the figures, FIG. 1 is an isometric illustration and partial cross-section of a structural barrier system 10, in this case for a window installation. Shown in FIG. 1 is typical wood framing construction for a through-hole 12 designed to receive the window unit 14. The rough opening formed by the through-hole 12 is framed at the top by a header 16, in this case shown formed by a plurality of wood framing members 18 supported on trimmer studs (not shown) that in turn are supported at the bottom by the window sill 20. Portions of cripple studs 22 are shown on top of the header 16 and below the sill 20. Exterior sheathing 24 and an interior wall board 26 are attached in place to the framing members.

It is to be understood that the framing of the through-hole 12 for the window unit 14 is not limited to the particular construction shown in FIG. 1. The disclosed embodiments of the invention will have application to any rough opening formed by any type of construction. It is important, as with any window installation method that the rough opening formed by the through-hole 12 be prepared in a manner to ensure it is plumb, square, and dimensionally correct. It should also be smooth cut, clean and dry, with the sheathing 24 trimmed properly to support the window unit 12 and ensure long-term structural integrity of the exterior construction wall.

In accordance with one embodiment, a liquid-applied flashing composition is applied in a solid-liquid state to the through-hole 12 structural members as described in detail below. The composition disclosed herein may be applied to virtually all construction wall substrates, most notably Concrete Masonry Unit block walls, though each must be tested to verify performance expectations with regard to adhesion and compatibility. The construction wall and the opening where a component, such as window or door, would be installed must be sound and fabricated according to existing building code requirements of the local jurisdiction.

The substrate must be clean and free of foreign matter, water, or pollutants that may interfere with adhesion and long-term durability. Some substrates may require a primer or surface preparation procedure to maintain expected results of performance. The composition should not be applied to surfaces with standing or frozen water.

The coating composition is based on a liquid resin and a filler material. The composition can be applied to a wide range of substrates in a liquid or semi-solid form, which then cures into a continuous film or membrane. Upon curing, the liquid resin forms a cross-linked elastomer, which provides the film with flexibility, conformability and a desired level of adhesion to the substrate. The filler material further imparts a variety of physical properties, including stability, rheology, curing and hardened tensile properties. Unlike the known liquid applied flash membrane systems, the composition described herein is free of volatile solvent. The film does not shrink or otherwise deform after curing because no solvent evaporation occurs.

In one embodiment, the liquid resin is a silyl-terminated polyether. More particularly, the coating composition comprises a silyl-terminated polyether, a filler material, and a curing catalyst.

Silyl-terminated polyethers are linear polyether chains capped at both termini with silyl groups. During curing, the silyl groups between polyether chains are coupled and the polyether chains become cross-linked to form the final elastomer.

Polyethers, also referred to as polyalkylene oxides, typically comprise linearly arranged repeating units of alkylene oxides (—R—O—), wherein R is an alkylene. "Alkylene" refers to a straight or branched divalent hydrocarbon chain consisting solely of carbon and hydrogen. The hydrocarbon chain is fully saturated and contains from one to six carbon atoms. The alkylene is attached to the rest of the molecule through single bonds at its respective terminal carbons. In a polyether, each alkylene is connected to two oxygen atoms. Exemplary alkylenes include, without limitation, methylene, ethylene, propylene, n-butylene, and the like. Preferred polyethers can be polyethylene oxide, polypropylene oxide, and the like.

The molecular weight of the linear polyether chain can impact the physical properties (elasticity, durability, etc.) of the final cured film. The molecular weight is directly related to the number of the repeating units of alkylene oxide. The silyl terminal groups can be represented by —$SiR^1_t(OR^2)_{3-t}$, in which t is 0, 1 or 2. $R^1$ and $R^2$ are the same or different and independently an alkyl group containing 1 to 6 carbons. Alkyl refers to a linear or branched monovalent hydrocarbon radical containing no unsaturation. Exemplary alkyls include methyl, ethyl, propyl, and the like. The silyl group has at least one alkoxy group, i.e., —$OR^2$, which is responsible for coupling with another silyl group by forming a —Si—O—Si— linkage. An example of a silyl terminal group is when t is 1 and both $R^1$ and $R^2$ are methyl. The silyl terminal group can therefore be represented by —$Si(CH_3)(OCH_3)_2$ (dimethoxymethylsilyl).

The silyl-terminated polyether can be prepared by known methods in the art. For example, polyethers are typically terminated with hydroxy groups, which are reactive to silylating agents. An example of a silylating agent is Cl—$SiR^1_t(OR^2)_3$, in which, $R^1$, $R^2$ and t are as defined herein.

The silyl-terminated polyethers are also commercially available from, for example, Kaneka America Corporation (New York, N.Y.) In a preferred embodiment, the silyl-terminated polyether is Kaneka® 303H, a polypropylene oxide capped with —$Si(CH_3)(OCH_3)_2$ at both ends.

The silyl-terminated polyether is typically present in the coating composition at about 15-60% by weight based on the total weight of the coating composition. More typically, it is present at about 20-40% by weight. More typically, it is present at about 25-30% by weight.

The filler material impacts the processing, curing and the ultimate performance of the final film. A suitable filler material can be a mineral, which can be selected based on its particulate size, hardness, wettability and other physical properties. In one embodiment, calcium carbonate ($CaCO_3$) can be used. $CaCO_3$ is available under the trade name Duramite® from Imerys International (Roswell, Ga.) The filler material can represent at about 35-60% by weight based on the total weight of the coating composition. More typically, the filler material is present at about 50% by weight.

Suitable curing catalysts for cross-linking silyl-terminated polyethers include organometallic compounds. The organometallic compounds may be organotin compounds such as dimethyltin dilaurate, dibutyltin dilaurate, dibutyltin dimercaptide, dibutyltin oxide, dimethyltin dithioglycolate, dioctyltin dithioglycolate, and the like. In one embodiment, the curing catalyst is Fomrez® SUL-11A (dibutyltin oxide), available from GE Silicones (Wilton, Conn.) Typically, the curing catalyst can be present at about 1-2.5% by weight based on the total weight of the coating composition. More typically, the curing catalyst is present at about 1.5%.

The coating composition can comprise other additives to further optimize the performance of the film. These addictive include, without limitation, adhesion promoters, stabilizers (antioxidant, ultraviolet (UV) absorber, dehydrator), plasticizers, pigments, etc.

The adhesion promoter can be an aminosilane such as N-β-aminoethyl-γ-aminopropyltrimethoxysilane, aminomethyltrimethoxysilane, aminopropyltriethoxysilane, etc. In one embodiment, the adhesion promoter is as N-β-aminoethyl-γ-aminopropyltrimethoxysilane, available under the trade name Silquest® A-1120 from GE Silicones (Wilton, Conn.) The adhesion promoter is preferably added at about 0.7-2.5% by weight based on the total weight of the coating composition. More typically, the adhesion promoter is present at about 1.5%.

A number of stabilizers can also be used to counter various adverse environmental factors, such as light, moisture and oxidization conditions. For example, light stabilizers that absorb broad spectrum of ultraviolet rays can be used. An example is Tinuvin® 328 (hydroxyphenylbenzotriazole) from Ciba Specialty Chemicals Co. (Terrytown, N.Y.) Another type of light stabilizers does not absorb ultraviolet rays, but acts to inhibit photo-initiated degradation of the film. Examples of this type of light stabilizer include hindered amine light stabilizers, which are derivatives of 2,2,6,6-tetramethyl piperidine. In one embodiment, the light stabilizer is Tinuvin® 765 (bis(1,2,2,6,6-pentamethyl-4-piperidyl) sebacate), which is available from Ciba Specialty Chemicals Co. (Terrytown, N.Y.). Each type of light stabilizer can typically be present at about 0.15-0.25% by weight based on the total weight of the coating composition, and more typically, at about 0.2%.

Dehydrators are moisture-scavenging agents that prevent moisture-induced degradation of the film. In certain embodiments, the dehydrators can be alkoxysilane datives. One example of the dehydrator is Silquest® A-171 (vinyltrimethoxysilane), available from GE Silicones (Wilton, Conn.) The dehydrator can typically be present in the coating composition at about 0.5-1% by weight based on the total weight of the coating composition, and more typically, at about 0.7%.

Plasticizers can also be added to the coating composition to enhance the flexibility and durability of the film. They also act to increase the workability of the coating composition during the application process. Any known plasticizer can be used. In certain embodiment, phthalate-based plasticizers can be used because they are particularly compatible with polyethers, e.g., polypropylene oxide. Exemplary plasticizers include, without limitation, diisodecyl phthalate (DIDP), dissiononyl phthalate (DINP), butyl benzyl phthalate (BBzP), and the like. The plasticizer can typically be present at about 15-25% by weight based on the total weight of the coating composition, more typically, at about 18%.

Pigments or colorants can also be added. If desired, the amount of the pigments can be controlled to maintain the opacity of the film. For example, the film formed by the cured coating composition can become opaque at the required thickness of about 12 mil (about 0.3 mm) for a liquid applied flash membrane, the opacity of the film allowing for an easy inspection. Typically, black and red pigments are used. For example, about 0.7-5% of red iron oxide pigments (HR-1209), available from Hoover Color Corp. (Hiwassee, Va.), can be used. Black pigments such as carbon black can also be added. For example, about 0.02-2% by weight of Monarch® 280 from Cabot Corporation (Alpharetta, Ga.) can be used.

Table 1 below lists the components of an exemplary coating composition according to one embodiment.

TABLE 1

| Components | Material Description | % by weight |
| --- | --- | --- |
| Kaneka ® 303H | liquid resin | 27 |
| Duramite ® | CaCO$_3$ as filler | 50 |
| Fomrez ® Sul-11a | organotin curing catalyst | 1.5 |
| Silquest ® A-1120 | adhesion promoter | 1.5 |
| DIDP | plasticizer | 18 |
| Tinuvin ® 328 | ultraviolet absorber, light stabilizer | 0.2 |
| Tinuvin ® 765 | hindered amine as a light stabilizer | 0.2 |
| Silquest ® A-171 | dehydrator | 0.7 |
| Red Iron Oxide | red pigments | 0.8 |
| Monarch ® 280 | carbon black pigments | 0.02 |

Figure 2:
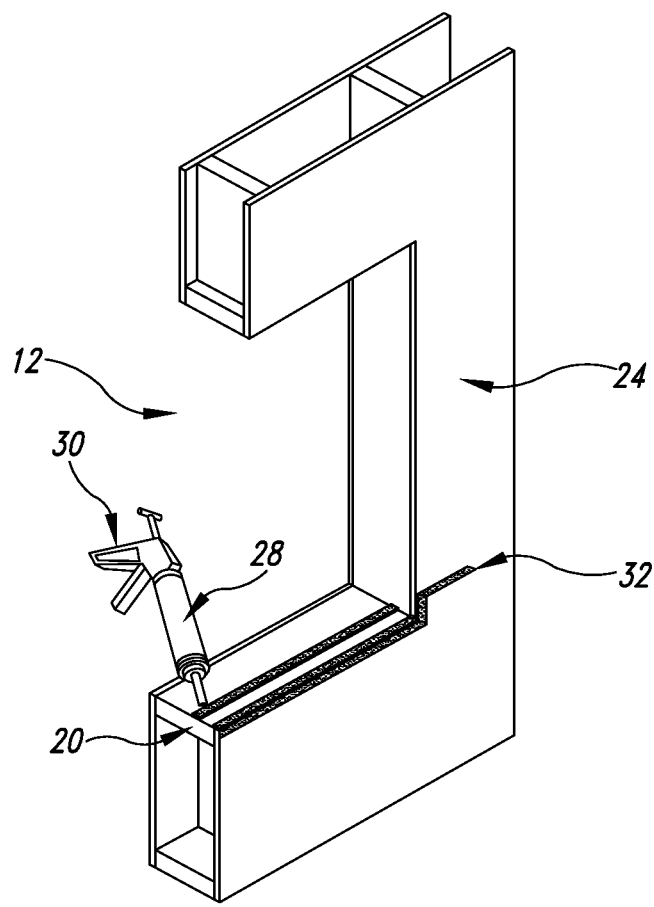
FIGS. 2-9 illustrate the installation procedure for constructing a structural barrier system for the window of FIG. 1.

Referring next to FIGS. 2-9, shown therein are the steps for applying the composition to the structural members surrounding the through-hole 12. The liquid-applied flashing membrane composition is stored in the solid liquid state in cartridges or bulk to be applied with standard caulk tools then brushed, rolled, or troweled to a desired coating thickness. As shown in FIG. 2, a cartridge 28 is loaded into a standard caulking gun 30. Prior to application, the structural surface may need to be primed. If so, readily commercially available primers can be used, such as Dow Corning 1200 Primer or Dow Corning 1205 Primer. The composition material 32 is applied to the exposed surface of the seal 20 and to the sheathing 24 on the horizontal sides of the through-hole 12. None of the composition material is applied to the sheathing 24 below the sill 20.

Figure 3:
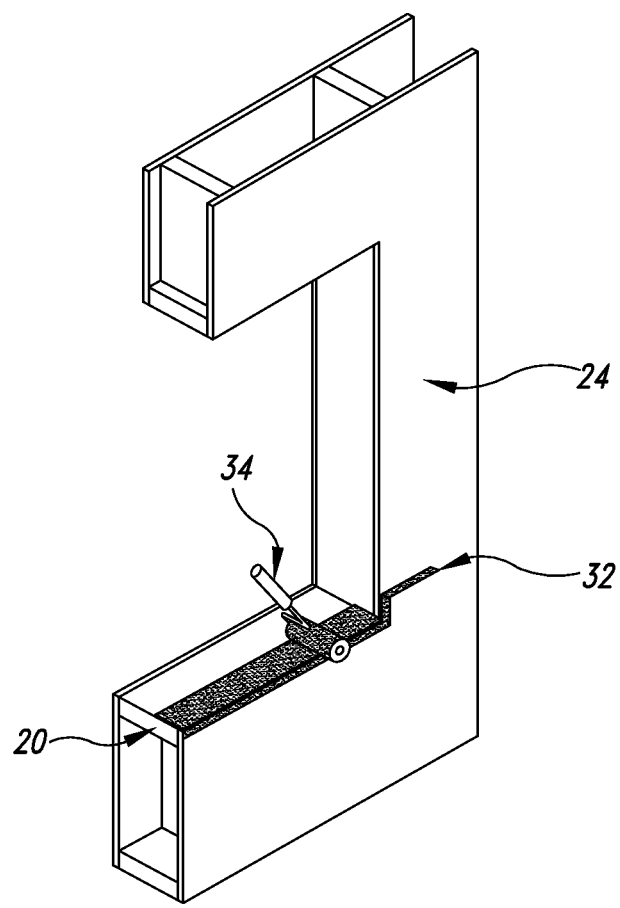

The material 32 is then rolled with a roller 34 as shown in FIG. 3 to the desired thickness on the sill 20 and the sheathing 24. Due to the presence of a predetermined amount of red iron oxide pigment in the material 32, the material will remain transparent until approximately 11 mil thickness, where it begins to turn slightly opaque, and then it becomes completely opaque at 12 mil thickness. The opaqueness or transparency of the material 32 is dependent on thickness and not on its state, i.e., whether it is cured or uncured. This facilitates inspection to ensure that the material 32 is prepared to the correct thickness of 12 mil.

It is to be understood that the dimensions set forth above are approximations, and variation can be made to accommodate particular applications. Thus, the material 32 can be applied in the range of 2 inches to 12 inches to the horizontal sides of the through-hole 12 on the sheathing 24 and it can slightly overlap the bottom of the through-hole 12 onto the sheathing 24 as shown in FIG. 2. The range of thickness can be 10-14 mil.

Figure 4:
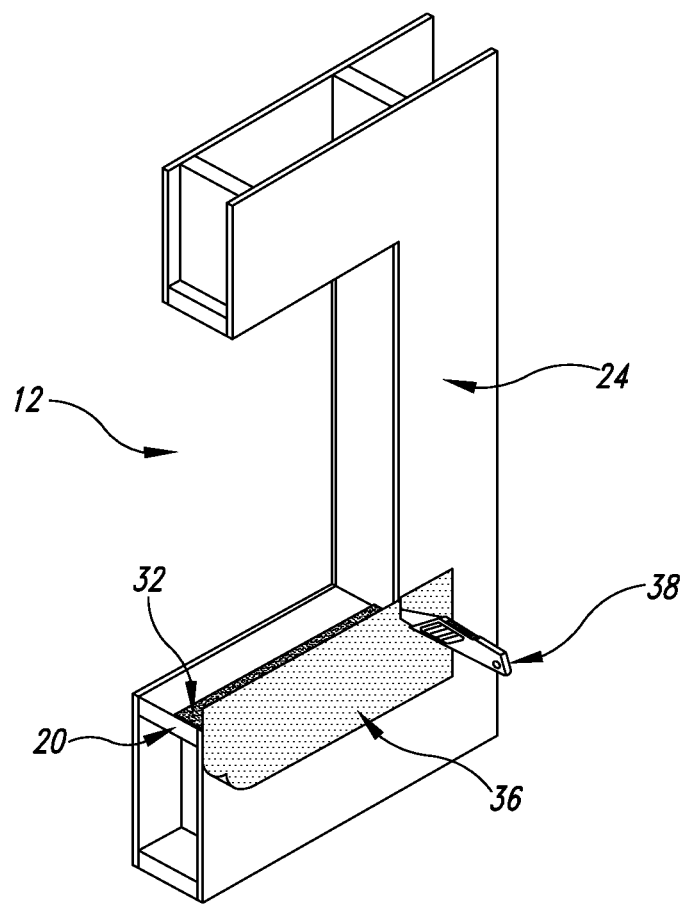
Figure 5:
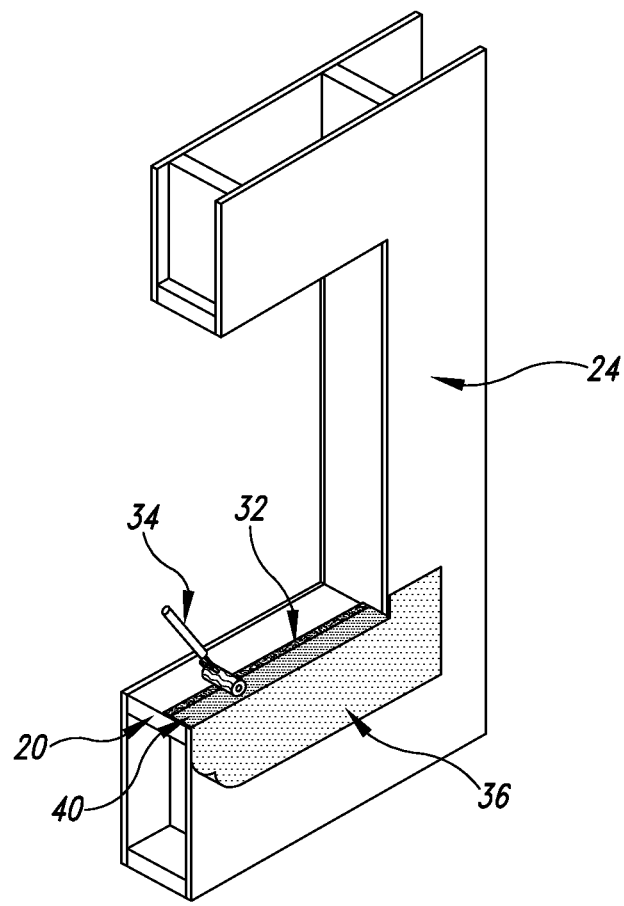
Figure 6:
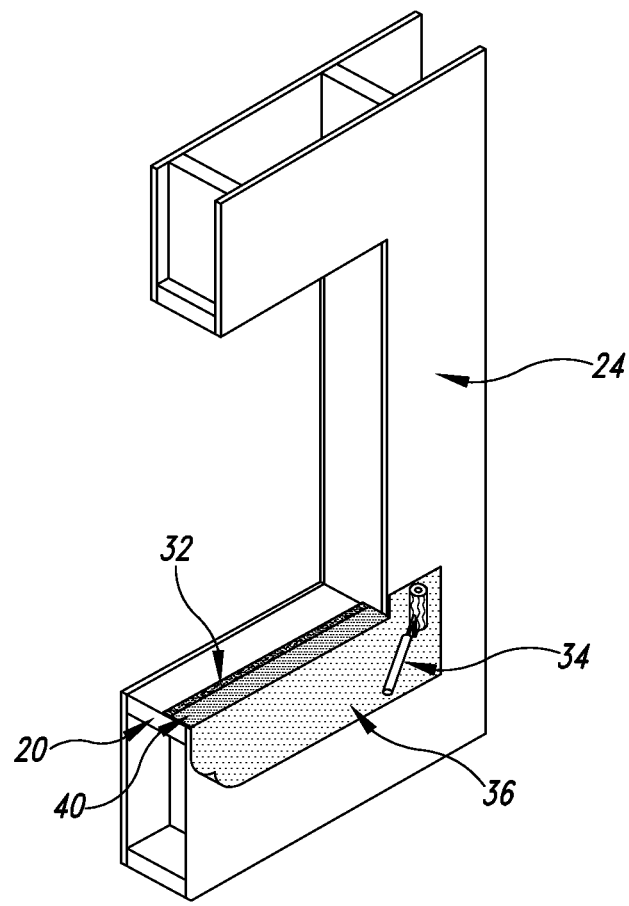
Figure 7:
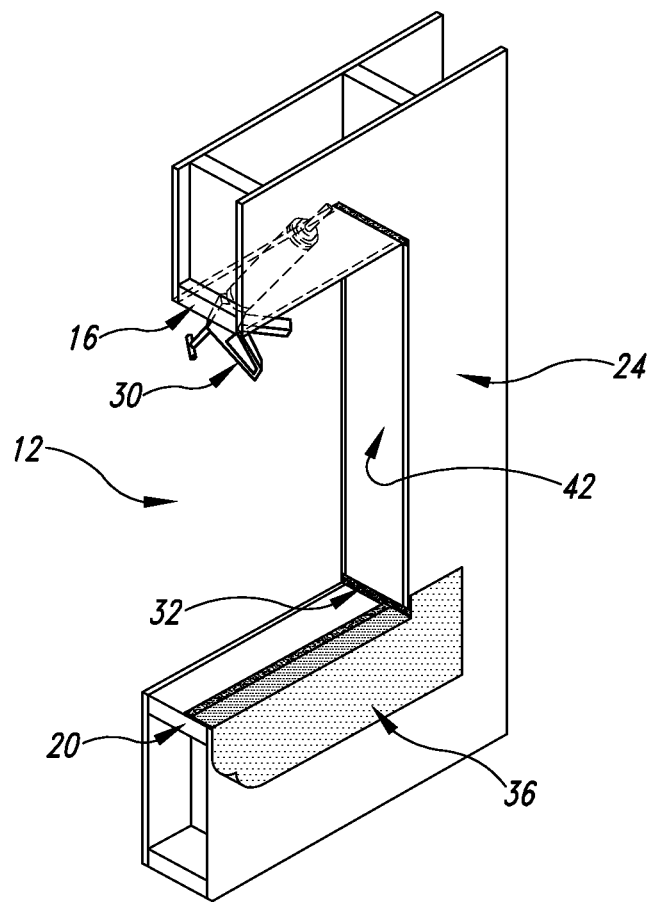
Figure 8:
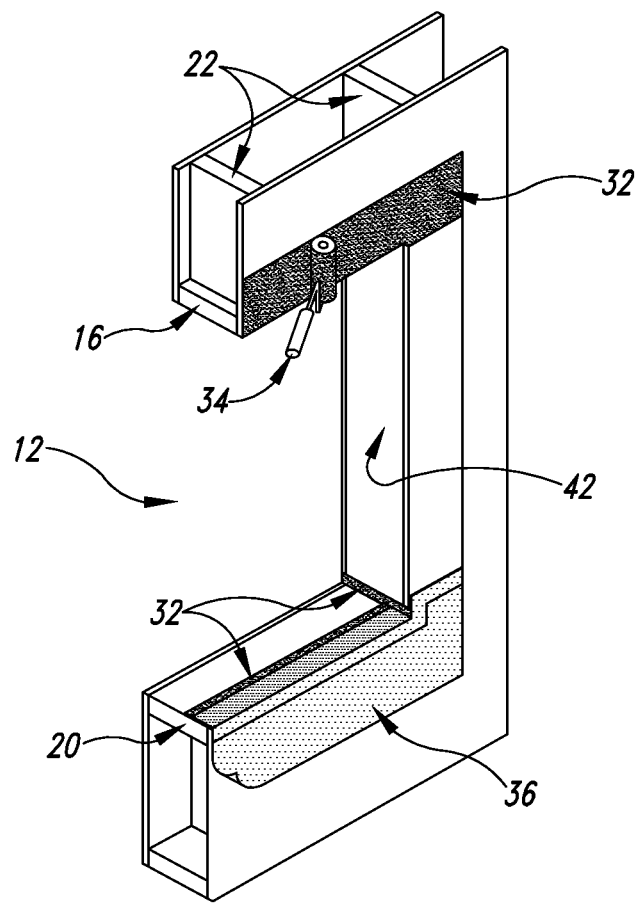

After preparation with the roller 34, and while the liquid-applied flashing membrane material 32 is still uncured, a pre-creased fabric counter-flashing 36 is applied as shown in FIG. 4. More particularly, the flashing 36 is a transition material that is readily commercially available, such as the Sure Flash™ wrap available from Flashing Products, Inc. As shown in FIG. 4, the flashing 36 is dimensioned and positioned so that it extends the 9 inches to the sides of the through-hole 12 and extends above the sill 20 approximately 3 inches. The flashing 36 is then cut with a cutting tool 38 on each edge of the through-hole 12 down to the sill 20. This forms a flap 40 that is folded over onto the sill 20 as shown in FIG. 5. The roller 34 is used to press the flap 40 into the liquid-applied flashing membrane composition 32 while still in the uncured state. The flashing 36 is also rolled onto the material 32 applied to the sheathing 24 as shown in FIG. 6.

Figure 9:
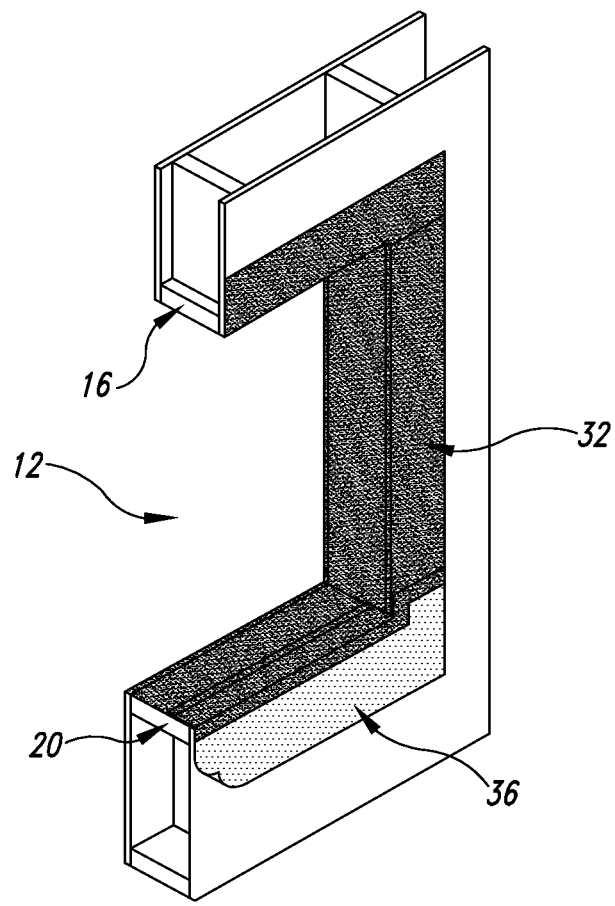

Additional liquid-applied flashing material 32 is applied with the caulk gun 30 to the exposed side 42 and exposed surfaces of the header 16 and seal 20 as well as 9 inches on the sheathing 24 surrounding the entire through-hole 12. It is rolled with the roller 34 to the correct thickness. The fully prepared structural opening is shown in FIG. 9. It is to be understood that the portion of the structure that has been cut away is prepared in an identical fashion as described above. A cure time of 30 minutes or dry to the touch should be allowed before any window or door installation.

Referring again to FIG. 1, in this case a window unit 14 is placed into the through-hole 12, which in this case has been prepared by brushing using brushes 44 as shown. Once the material 32 has dried, the through-hole 12 can be exposed to weather for extended periods without damage. The window unit 14 is preferably installed with drainage mesh or shims (not shown) at a bottom flange to allow for water management. A closed-cell foam backer rod is pushed into a gap around the interior side of the window unit 12 to ensure a proper depth-to-width ratio. This backer rod is readily commercially available and known to those skilled in the art. Hence, will not be described in detail herein. An interior seal 48 is then applied around the entire window frame, preferably using the caulk gun 30. The uncured sealant is preferably tooled with appropriate equipment (such as a spatula) to ensure proper contact with the window frame and the coated rough opening surfaces.

The interior sealant is also readily commercially available, such as from applicant under the trade name WS-7100 and is applied at the same time as installation of the backer rod. Preferably the sealant 48 is applied with a pressure-operated device to form a uniform continuous speed, such as the caulk gun 30 described above. It is important that the sealant 48 be free of air pockets and embedded matter. Ideally a concave tooled joint is formed.

The composition provides a continuous film that is easily inspected by becoming opaque at the required film thickness of 12 mils. The material is waterproof, meets air barrier requirements ASTM E2178, has elastomeric properties, including 400% stretch, to allow substrate expansion, contraction and movement, meets primer-less adhesion requirements to most substrates, emits no noxious odors of flammable solvents, does not shrink or lose volume as it cures, and resists weather damage for up to 6 months exterior exposure. The material cures rapidly enough, 15-30 minute tack-free, to not hinder construction schedule, has sufficient adhesion to transition flashing to incorporate into a designed drainage plane and allow integration with a continuous air barrier system. Preferably, the barrier is at least semi-vapor-permeable.

The disclosed composition provides for a building structure consisting of exterior walls that include rough openings, having components such as windows and doors installed in such openings that is coated with a material that provides resistance to water and air intrusion. Ideally, the liquid-applied flashing material is waterproof and semi-permeable in that it permits vapor to pass therethrough to a certain extent. Vapor as used herein refers to water particles suspended in air.

Typical sheet materials used in window and door installations are not vapor penetrable and tend to trap water. Metal has the disadvantage of corroding and provides thermal conduction, which can limit the life of a window or door installation. The liquid-applied flashing material of the embodiments described herein is weather durable, is not liquid penetrable, but it provides some vapor permeability, is bondable to a wall or building envelope, is easy to inspect, and provides a flexible structure that can stretch after it is dried. In addition, it can be installed using common tools, does not shrink as it cures, which avoids built-in tension, does not use solvents, and can bond to wet or moist substrates.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method of forming a structural barrier system for a through-hole in a wall, comprising:
    applying a liquid flashing membrane material to prepared surfaces of a frame and sheathing in the through-hole in the wall, the material comprising a liquid rosin in the form of a silyl-terminated polyether, a filler material, a curing catalyst, and a red iron oxide pigment of sufficient amount to make the liquid-applied flashing membrane material transparent until approximately 12 mil thickness after which it becomes opaque, regardless of its cured or uncured state; and
    rolling the liquid applied flashing membrane material on the prepared surface to a thickness where the liquid-applied flashing membrane material is in the range of 10 mil to 14 mil.

2. The method of claim 1, further comprising installing a framed window or door unit in the through-hole after the material has cured.

3. The method of claim 1, further comprising after the rolling, applying a sheet of flashing to a selected area in the through-hole and at least partially on the liquid-applied flashing membrane material.

4. The method of claim 1, wherein the applying the liquid flashing membrane material to the prepared surfaces comprises using a roller to achieve a thickness of the liquid flashing membrane material where it becomes opaque.

5. The method of claim 4, wherein the liquid flashing membrane material is rolled to a thickness of about 12 mil.

6. The method of claim 1, comprising initially providing a liquid flashing membrane material that comprises by percent of weight based on the total weight of the material: the silyl-terminated polyether comprising a primary polymer of a cross linked polymer chain of n-(CH—CH$_2$O)-n polypropylene oxide and a functional group (H$_3$CO)$_2$Si-dimethoxymethylsilyl, modified by up to at least one of 15-25% diisodecyl phthalate, 36-60% CaCO$_3$, 0.02-2.0% carbon black pigment, 0.15-0.25% hydroxyphenylbenzotriazole, 0.15-0.25% bis(1,2,2,6,6-pentamethyl-4-piperidyl) sebacate, 1.0-2.5% dibutyltin oxide, 0.75-2.5% N-β-aminoethyl-γ aminopropyltrimethoxysilane, and 0.5-1.0% vinyltrimethoxysilane.

7. The method of claim 1, comprising initially providing a liquid flashing membrane material that comprises by percent of weight based on the total weight of the material: the silyl-terminated polyether comprising a primary polymer of a cross linked polymer chain of n-(CH—CH$_2$O)-n polypropylene oxide and a functional group (H$_3$CO)$_2$Si-dimethoxymethylsilyl, modified by up to at least one of 18% diisodecyl phthalate, 50% CaCO$_3$, 0.02% carbon black pigment, 0.2% hydroxyphenylbenzotriazole, 0.2% bis(1,2,2,6,6-pentamethyl-4-piperidyl) sebacate, 1.5% dibutyltin oxide, 1.5% N-β-aminoethyl-γ-aminopropyltrimethoxysilane, and 0.7% vinyltrimethoxysilane.

8. A method, comprising:
    constructing a through-hole in a wall having a frame formed of a header, a sill, trimmer studs connecting the header to the sill, and sheathing attached to the frame;
    applying a liquid flashing membrane material to prepared surfaces of the frame and the sheathing, the liquid flashing membrane material comprising a liquid rosin, a filler material, a curing catalyst, and a red iron oxide pigment of sufficient amount to make the liquid applied flashing membrane material transparent until approximately 12 mil thickness after which it becomes opaque, regardless of its cured or uncured state;
    distributing the liquid flashing membrane material across the prepared surfaces to achieve a uniform thickness at which the material becomes opaque; and
    allowing the material to cure.

9. The method of claim 8, further including installing a window or door unit in the through-hole after the material has cured.

10. The method of claim 8, further including applying a sheet of flashing to a selected area in the through-hole and at least partially on the liquid flashing membrane material prior to allowing the liquid flashing membrane material to cure.

11. The method of claim 8, wherein the distributing comprises using a roller to achieve a uniform thickness of the material in the range of 10-14 mil.

12. The method of claim 11, wherein the thickness of the liquid flashing membrane material is about 12 mil.

13. The method of claim 8, comprising initially providing a liquid flashing membrane material that comprises by percent of weight based on the total weight of the material: the silyl-terminated polyether comprising a primary polymer of a cross linked polymer chain of n-(CH—CH$_2$O)-n polypropylene oxide and a functional group (H$_3$CO)$_2$Si-dimethoxymethylsilyl, modified by up to at least one of 15-25% diisodecyl phthalate, 36-60% CaCO$_3$, 0.02-2.0% carbon black pigment, 0.15-0.25% hydroxyphenylbenzotriazole, 0.15-0.25% bis(1,2,2,6,6-pentamethyl-4-piperidyl) sebacate, 1.0-2.5% dibutyltin oxide, 0.75-2.5% N-β.-aminoethyl-γ aminopropyltrimethoxysilane, and 0.5-1.0% vinyltrimethoxysilane.

14. The method of claim 8, comprising initially providing a liquid flashing membrane material that comprises by percent of weight based on the total weight of the material: the silyl-terminated polyether comprising a primary polymer of a cross linked polymer chain of n-(CH—CH$_2$O)-n polypropylene oxide and a functional group (H$_3$CO)$_2$Si-dimethoxymethylsilyl, modified by up to at least one of 18% diisodecyl phthalate, 50% CaCO$_3$, 0.02% carbon black pigment, 0.2% hydroxyphenylbenzotriazole, 0.2% bis(1,2,2,6,6-pentamethyl-4-piperidyl) sebacate, 1.5% dibutyltin oxide, 1.5% N-β-aminoethyl-γ-aminopropyltrimethoxysilane, and 0.7% vinyltrimethoxysilane.

\* \* \* \* \*